US012434353B1

(12) United States Patent
Swallow

(10) Patent No.: US 12,434,353 B1
(45) Date of Patent: Oct. 7, 2025

(54) SMALL PART CLAMPING DEVICE PROVIDING A HIGH DEGREE OF PARALLELISM

(71) Applicant: Honeywell Federal Manufacturing & Technologies, LLC, Kansas City, MO (US)

(72) Inventor: Kevin William Swallow, Kansas City, MO (US)

(73) Assignee: Honeywell Federal Manufacturing & Technologies, LLC, Kansas City, MO (US)

( * ) Notice: Subject to any disclaimer, the term of this patent is extended or adjusted under 35 U.S.C. 154(b) by 0 days.

(21) Appl. No.: 18/970,540

(22) Filed: Dec. 5, 2024

(51) Int. Cl.

| | |
|---|---|
| ***B25B 1/00*** | (2006.01) |
| ***B25B 1/02*** | (2006.01) |
| ***B25B 1/10*** | (2006.01) |
| ***B25B 1/24*** | (2006.01) |
| ***B25B 5/00*** | (2006.01) |
| ***B25B 5/10*** | (2006.01) |

(52) U.S. Cl.
CPC .............. *B25B 1/2447* (2013.01); *B25B 1/02* (2013.01); *B25B 1/103* (2013.01); *Y10S 269/902* (2013.01)

(58) Field of Classification Search
CPC .......... B25B 1/2447; B25B 1/02; B25B 1/103
USPC ........... 473/557; 24/516; 269/902, 166, 169, 269/86; 451/385
See application file for complete search history.

(56) References Cited

U.S. PATENT DOCUMENTS

| | | | | | |
|---|---|---|---|---|---|
| 732,013 | A * | 6/1903 | Smith | B25B 1/103 | 269/222 |
| 2,551,648 | A * | 5/1951 | Suben | B24B 9/146 | 451/385 |
| 3,575,405 | A | 4/1971 | Harding | | |
| 4,484,742 | A * | 11/1984 | McCrone | A63B 49/025 | 473/557 |
| 4,874,170 | A * | 10/1989 | Zech | A63B 51/14 | 269/169 |
| 6,093,121 | A * | 7/2000 | Bishop | A63B 51/14 | 473/557 |
| 7,798,478 | B2 | 9/2010 | Janson et al. | | |
| 9,908,009 | B1 * | 3/2018 | Lee | A63B 51/14 | |

FOREIGN PATENT DOCUMENTS

TW 200400069 A * 1/2004 ............ A63B 51/14

* cited by examiner

*Primary Examiner* — Mahdi H Nejad
(74) *Attorney, Agent, or Firm* — Erise IP, P.A.

(57) ABSTRACT

A clamp assembly for securing small parts is described herein. In some embodiments, the clamp assembly comprises a free jaw and a fixed jaw configured to secure a part positioned at a proximal end of the clamp assembly between a free jaw pad and a fixed jaw pad. The free jaw is configured to rotate at least about a size pin positioned at a distal end of the fixed jaw opposite the part. The free jaw is rotated by a tightening feature positioned proximate the free jaw pad and fixed jaw pad at the proximal end. As the tightening feature is actuated, the free jaw pad rotates toward the fixed jaw pad securing the part therebetween when the fixed jaw pad and the free jaw pad are substantially parallel.

15 Claims, 6 Drawing Sheets

SMALL PART CLAMPING DEVICE PROVIDING A HIGH DEGREE OF PARALLELISM

BACKGROUND

1. Field

Embodiments of the current disclosure relate to a clamp for holding small parts. More specifically, embodiments of the current disclosure relate to a small-part clamping device that provides parallelism between clamping surfaces to secure small parts with relatively low local pressure.

2. Related Art

Standard vises are available from many vendors and sources in the marketplace and are sized to secure different part sizes. However, typical clamps lack control of parallelism between clamp pads. Low parallelism between pads can negatively impact the clamping action and securing of parts. Standard commercially available vises typically provide somewhat parallel clamping surfaces for clamping onto a part. However, when the clamp pads are closed to secure the part, the clamp pads can rotate to an out-of-parallel condition as the clamping force is increased to secure the part. Generally, the out-of-parallel condition does not negatively impact large parts but can negatively impact small parts with small surface areas. For example, if the clamp pads are not parallel, a lower surface area is in contact between the clamp pads and the part, and therefore, a higher clamping force is necessary to secure the part. Generally, for large parts, applying more force (and therefore more pressure across the contact area) secures the part. However, for small parts, the higher applied force (and higher local pressure) also increases the likelihood that the clamping force damages the small part.

As such, systems and methods of clamping small parts with even pressure are needed to reduce the likelihood of damaging the part. To achieve this, a reusable small-part clamping device that is adjustable for various part sizes while maintaining parallelism between the clamping surfaces is described herein.

SUMMARY

Embodiments of the current disclosure solve the above-described problems and provide a distinct advance in the art by providing a small-part clamp assembly that can clamp a small part between clamp surfaces while providing a high degree of parallelism.

An embodiment of the current disclosure comprises a clamp assembly for securing a part. The clamp assembly comprises a free jaw comprising a free jaw pad at a free jaw proximal end, a fixed jaw comprising a fixed jaw pad at a fixed jaw proximal end, a size pin disposed between the free jaw and the fixed jaw and contacting the free jaw at a free jaw distal end and contacting the fixed jaw at a fixed jaw distal end, and a tightening feature spanning a space between the free jaw and the fixed jaw, wherein the tightening feature is configured to rotate the free jaw about the size pin and move the free jaw pad relative to the fixed jaw pad until the free jaw pad and the fixed jaw pad are substantially parallel and secure the part therebetween.

An embodiment of the current disclosure comprises a method of clamping a part by a clamp assembly. The method comprises actuating a vise actuator to move a free vise jaw, wherein the free vise jaw is adjacent a support plate and moves the support plate, wherein the support plate is adjacent a free jaw and moves with the free jaw as the vise actuator is actuated, securing a size pin between the free jaw and a fixed jaw as the vise actuator is actuated, positioning the part between a free jaw pad of the free jaw and a fixed jaw pad of the fixed jaw, actuating a tightening feature to rotate the free jaw pad about the size pin and toward the fixed jaw pad, and securing the part between the fixed jaw pad and the free jaw pad when the free jaw pad and the fixed jaw pad are substantially parallel.

This summary is provided to introduce a selection of concepts in a simplified form that are further described below in the detailed description. This summary is not intended to identify key features or essential features of the claimed subject matter, nor is it intended to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

and

Figure 6:
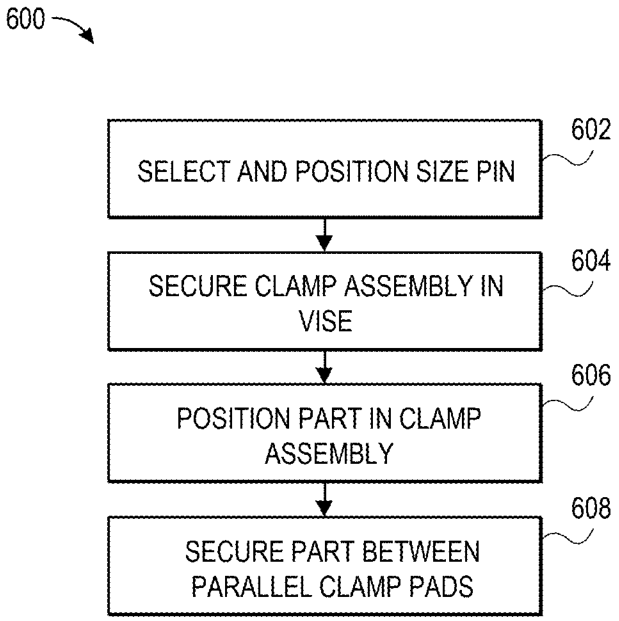

FIG. 6 depicts an exemplary process of securing small parts in the clamp assembly.

The drawing figures do not limit the invention to the specific embodiments disclosed and described herein. The drawings are not necessarily to scale; emphasis is instead placed upon clearly illustrating the principles of the invention.

DETAILED DESCRIPTION

The following description of embodiments of the invention references the accompanying illustrations that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense.

In this description, references to "one embodiment," "an embodiment," "embodiments," "various embodiments," "certain embodiments," "some embodiments," or "other embodiments" mean that the feature or features being referred to are included in at least one embodiment of the technology. Separate references to "one embodiment," "an embodiment," "embodiments," "various embodiments," "certain embodiments," "some embodiments," or "other embodiments" in this description do not necessarily refer to the same embodiment and are also not mutually exclusive unless so stated and/or except as will be readily apparent to those skilled in the art from the description. For example, a feature, structure, act, etc., described in one embodiment may also be included in other embodiments but is not necessarily included. Thus, the current technology can include a variety of combinations and/or integrations of the embodiments described herein.

Generally, embodiments of the current disclosure provide a clamp assembly configured to secure small parts or parts of any size requiring even clamping pressure. In some embodiments, the clamp assembly is configured to secure parts between clamp pads with high parallelism such that a relatively high surface area of the part is in contact with the clamping surfaces. As a high surface area of the clamping surfaces is applied to the part, the clamping force will be distributed across that surface area. As the surface area between the clamping surfaces and the part increases due to the high degree of parallelism, the local pressure required to hold the part may decrease, reducing the likelihood of damaging the part.

In some embodiments, the clamp assembly comprises two clamp jaws, which can be fabricated and ground to very tight tolerances to facilitate the control of parallelism. The clamp jaws may be installed on a standard (non-custom) vise or custom vise, where a fixed jaw can be affixed to the body of the vise, and a free jaw is free to rotate about at least one pivot point. For example, the free jaw pad and the fixed jaw pad may be designed substantially parallel (e.g., with a tolerance of parallelism to match the tolerance identified for the part to be held in the clamp).

In some embodiments, a size pin may be disposed between the two clamp jaws toward a distal end of the part. The diameter of the pin may be determined based on the thickness of the clamped part so that the clamp pads will be substantially parallel when they contact the part. Once the size pin has been inserted, the vise may then be tightened until the size pin is secured between the two clamp jaws.

Once the size pin is positioned between the two jaws at the distal end of the clamp jaws, the part may be inserted between the two clamp pads at the proximal end of the two clamp jaws. In some embodiments, a tightening feature may be positioned between the part and the size pin and coupled to the free jaw and fixed jaw such that when the tightening feature is actuated, the free jaw may pivot about the size pin and/or an extension positioned in a groove of a support plate. As the tightening feature rotates/actuates, the free clamp pad rotates toward the fixed clamp jaw to secure the part therebetween. When the free clamp pad rotates such that the surface is parallel to the surface of the fixed clamp pad, the distance between the clamp pads is equal to the thickness of the part, and the clamping force is uniformly applied to secure the part.

In some embodiments, the degree of parallelism between the two clamp pads is impacted by the distance from the size pin to the clamp pads. A larger distance can provide superior control of parallelism, and a smaller distance can provide less control of parallelism. Therefore, in some scenarios, it is advantageous to use a larger distance. However, a larger distance can also increase the cost of fabricating the clamp jaws. Because the thickness of clamped parts will not be precisely the same from one part to the next, a larger distance can better accommodate any variability in part thickness and tolerances in the components of the clamp assembly.

Figure 1:
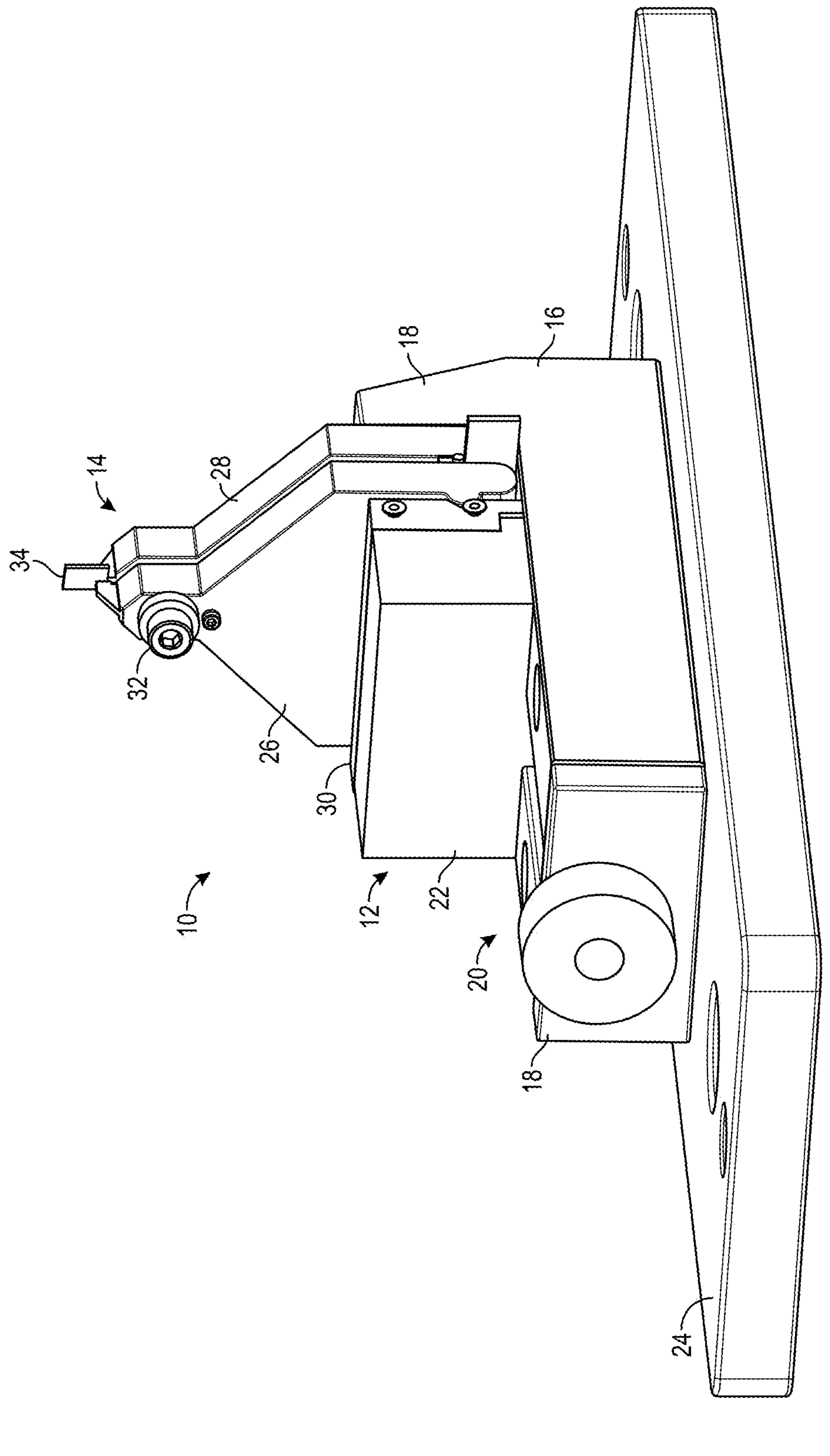
FIG. 1 depicts an embodiment of a clamp assembly.

FIG. 1 depicts an embodiment of small-part clamp assembly 10. Small-part clamp assembly 10 may comprise vise 12. In some embodiments, platform 24 may support small-part clamp assembly 10. Platform 24 may be any surface customized specifically for small-part clamp assembly 10 or any standard surface for supporting small-part clamp assembly 10. In some embodiments, vise 12 may be a standard commercially available vise or may be custom manufactured. Either way, vise 12 may initially provide a clamping motion to set clamp assembly 14. In some embodiments, vise 12 may comprise base 16 comprising fixed vise jaw 18. Furthermore, vise 12 may comprise knob 20 for rotating vise screw 38 (illustrated in FIG. 2). As vise screw 38 rotates, free vise jaw 22 moves toward fixed vise jaw 18, securing clamp assembly 14 therebetween. Clamp assembly 14 may be positioned between free vise jaw 22 and fixed vise jaw 18 and may or may not be coupled thereto. The positioning of clamp assembly 14 in vise 12 is discussed in more detail below.

In some embodiments, clamp assembly 14 comprises free jaw 26, fixed jaw 28, support plate 30, and tightening feature 32. Part 34 (i.e., the part to be clamped) may be secured between free-jaw pad 60 (FIG. 4A) of free jaw 26 and fixed-jaw pad 62 (FIG. 4A) of fixed jaw 28. In some embodiments, support plate 30 is secured to free vise jaw 22, and free jaw 26 is adjacent and in contact with support plate 30. As free vise jaw 22 is moved by rotating knob 20 and, in turn, rotating vise screw 38, free jaw 26 may move toward fixed jaw 28 coupled to, or in contact with, fixed vise jaw 18. As free jaw 26 and fixed jaw 28 come together, part 34 is secured between free-jaw pad 60 and fixed-jaw pad 62.

In some embodiments, tightening feature 32 may be a screw as shown. As such, tightening feature 32 is referenced herein to rotate and provide torque; however, tightening feature 32 may be any actuator that rotates free jaw 26 toward fixed jaw 28 as described herein. For example, tightening feature 32 may be or comprise a screw, bolt, hinge, lever, or the like. Any device capable of performing the function of tightening feature 32 may be imagined. In some embodiments, tightening feature 32 may provide a force between free jaw 26 and fixed jaw 28. For example, tightening feature 32 may be an elastic or rubber band wrapped around free jaw 26 and fixed jaw 28 in proximity to part 34. The band size may be selected to provide the desired force between free-jaw pad 60 and fixed-jaw pad 62 to secure part 34, as described in the embodiments below. In another example, tightening feature 32 may comprise magnetic material and may be part of free jaw 26 and fixed jaw 28. As such, free jaw 26 and fixed jaw 28 may attract one another with a force substantially equivalent to the desired force to secure part 34. Any method of drawing free jaw 26 and fixed jaw 28 together to secure part 34 between free-jaw pad 60 and fixed-jaw pad 62 may be imagined.

Figure 2:
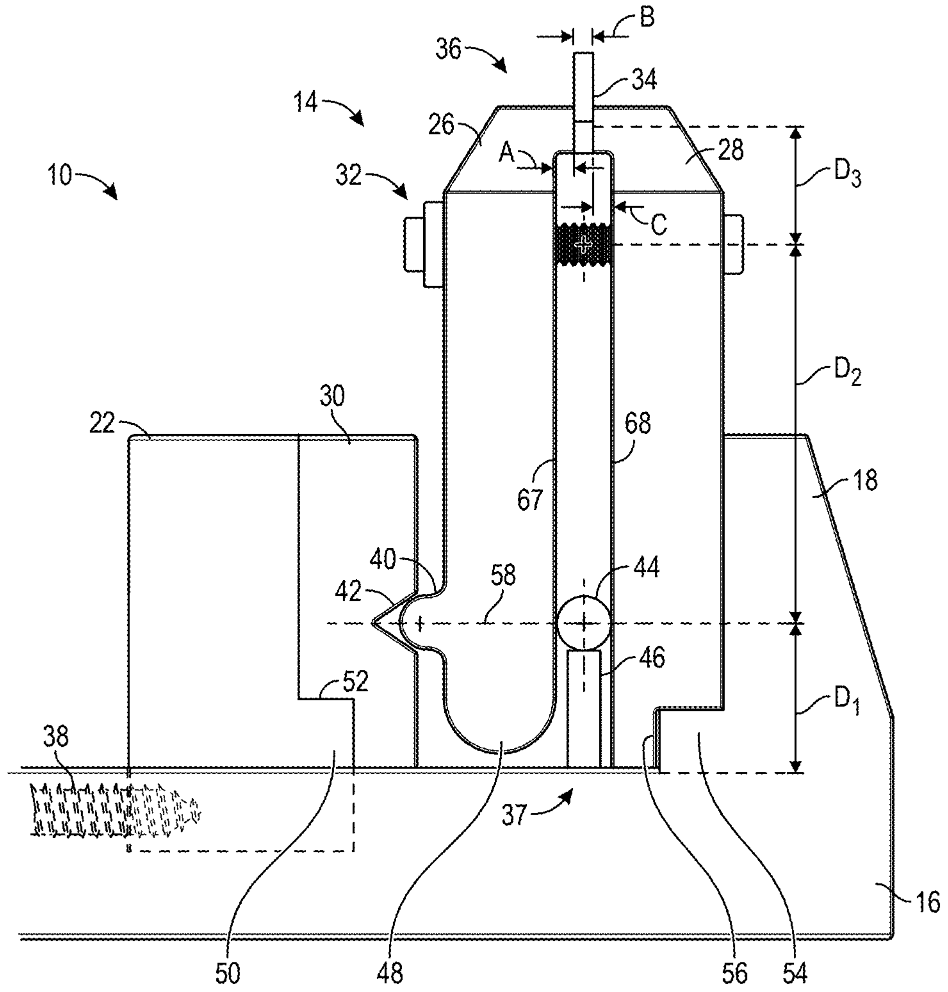
FIG. 2 depicts a side view of the clamp assembly.

FIG. 2 depicts a side view of an embodiment of small-part clamp assembly 10. As shown here, clamp assembly 14 further comprises free-jaw extension 40 and free-jaw end 48 of free jaw 26, groove 42 of support plate 30, size pin 44, and stand 46. Furthermore, support plate 30 and fixed jaw 28 may be secured to vise 12. In some embodiments, size pin 44 is configured to rest on stand 46, aligning the center of size pin 44 with the center of round portion of free-jaw extension 40 illustrated by centerline 58. As free vise jaw 22 moves toward fixed vise jaw 18, support plate 30 and free jaw 26 may move toward fixed jaw 28 until size pin 44 is contacted on one side by free jaw 26 and on the other side, opposite the first side, by fixed jaw 28. At this point, the movement of vise 12 is stopped, and clamp assembly 14 is secured in vise 12.

In some embodiments, to clamp a small part with a known thickness, clamp assembly 14 may comprise size pin 44 as described above. Size pin 44 may be custom-designed and manufactured or commercially available as a commercial off-the-shelf (COTS) size pin. COTS size pins are available in various sizes and tolerances and may be sufficient for embodiments described herein; however, it should be understood that size pin 44 may also be custom manufactured to any size, shape, and tolerance as needed. Though size pin 44 is shown and described as a cylinder with a circular cross section, the cross section of size pin 44 may comprise various shapes such as, for example, a square, an ellipse, or any other shape.

In some embodiments, the diameter of size pin 44 may be determined based on a nominal width B of part 34. Here, the distance between size pin 44 contact points of free jaw 26 and fixed jaw 28 can be determined by summing the distances of the A width of free jaw 26, the B width of part 34, and the C width of fixed jaw 28. The A width is the distance from free jaw face 67 of free jaw 26 to free-jaw pad 60, and the C width is the distance from fixed jaw face 68 of fixed jaw 28 to fixed-jaw pad 62 as, shown in FIG. 2. Here, A+B+C equals the desired diameter of size pin 44. In some embodiments, the A width and C width can be equal to zero. Using the dimensions A, B, and C, the size of size pin 44 can be determined such that the holding surfaces of free-jaw pad 60 and fixed-jaw pad 62 are parallel when securing part 34 within tolerance, as described below.

In some embodiments, clamp assembly 14 may be fabricated in various sizes based on the expected sizes of part 34. For example, a distance of 2.225 inches from size pin 44 to the center of free-jaw pad 60 and fixed-jaw pad 62 (D2+D3 as shown) may be used, and free-jaw pad 60 and fixed-jaw pad 62 may be approximately 0.1 inch high (distance P, FIG. 4A). The dimensions of size pin 44, free-jaw pad 60, and fixed-jaw pad 62, and distances D1, D2, D3 can be used to calculate the potential error that would result from variability in thickness of part 34. For example, if the part thickness tolerance is +/−0.002 inches, a maximum deviation of 0.002 inches from nominal will result in an angle error of 0.0515 degrees from parallel. The error angle can then be used to determine the maximum amount of parallel error that could exist between free-jaw pad 60 and fixed-jaw pad 62 using size pin 44 as the pivot point and the distance between the pivot point and the center of free-jaw pad 60 and fixed-jaw pad 62. In this exemplary scenario, an angle of 0.0515 degrees over a distance of 0.1 inch will result in a maximum parallelism error between free-jaw pad 60 and fixed-jaw pad 62 of to 0.00009 inches. If the width B of part 34 has a relatively large tolerance, then the size of size pin 44 can be calculated using the actual measured thickness of part 34 using dimensions A, B, and C to provide parallelism when part 34 is secured.

Furthermore, in some embodiments, the tightening force used to secure part 34 is created by tightening feature 32 that is close to (as shown by distance D3) free-jaw pad 60 and fixed-jaw pad 62. By minimizing the distance D3 between tightening feature 32 and free-jaw pad 60 and fixed-jaw pad 62, the amount of bending in, or deformation of, free-jaw pad 60 and fixed-jaw pad 62 (which could affect parallelism) is also minimized. Furthermore, the amount of tightening torque required to hold part 34 is relatively low because the clamping force is uniformly applied to the part surface. Therefore, only a low amount of clamping force is needed to hold a part for actions such as inspection using a coordinate-measuring machine. The tight parallelism between free-jaw pad 60 and fixed-jaw pad 62 makes it possible to use a lower local clamping pressure than when lower parallelism is achieved, as the total in-contact surface area is increased by the parallelism.

In some embodiments, when vise 12 is closed by vise screw 38, clamp assembly 14 may be secured between fixed vise jaw 18 and free vise jaw 22. Fixed vise jaw 18 may include fixed shelf 54 configured to receive and support fixed jaw 28. Fixed jaw 28 may include fixed notch 56 configured to be supported by fixed shelf 54. In some embodiments, fixed jaw 28 is configured to rest against fixed vise jaw 18 and on fixed shelf 54. Furthermore, in some embodiments, any fasteners may be used to secure fixed jaw 28 to fixed vise jaw 18. Similarly, in some embodiments, free vise jaw 22 may include free shelf 50 configured to receive and provide support for support plate 30. Support plate 30 may include support notch 52 configured to be supported by free shelf 50 of free vise jaw 22. In some embodiments, support plate 30 may be configured to rest against free vise jaw 22 and on free shelf 50. Furthermore, in some embodiments, any fasteners may be used to secure free vise jaw 22 to support plate 30 and fixed vise jaw 18 to fixed jaw 28. Generally, fixed jaw 28 may be coupled to free vise jaw 22 and fixed jaw 28 may be coupled to fixed vise jaw by bolts, screws, clamps, and the like. Any method of securing support plate 30 and fixed jaw 28 to vise 12 may be imagined.

Though embodiments described herein and shown in the figures illustrate support plate 30 generally as a plate, it should be noted that the term "plate" is exemplary only. Support plate 30 may be any size and shape and is not limited to linear and/or planar surfaces. Furthermore, in some embodiments, support plate 30 may not be needed. For example, free jaw 26 and fixed jaw 28 may be clamped between free vise jaw 22 and fixed vise jaw 18. Free-jaw extension 40 may contact free vise jaw 22 without any intermediate component. As such, support plate 30 may provide groove 42 and may be beneficial in some embodiments; however, in other embodiments, support plate 30 may not be necessary. Furthermore, in some embodiments, support plate 30 may be integrally formed with free vise jaw 22 in manufacturing such that free vise jaw 22 and support plate 30 are one and the same, and free vise jaw 22 comprises groove 42. In some embodiments, support plate 30 may be coupled to free vise jaw 22 by welding or other permanent or temporary fastening method.

In some embodiments, free jaw 26 comprises free-jaw extension 40. Free-jaw extension 40 may extend from a free jaw side of support plate 30 and interact with support plate 30. Size pin 44 and the rounded end of free-jaw extension 40 may be aligned. Stand 46 may be sized to provide the center of size pin 44 in line with centerline 58. In some embodiments, size pin 44 and free-jaw extension 40 may provide two points of rotation for free jaw 26. As shown, free-jaw extension 40 comprises a rounded cross section comprising a radius that fits within groove 42. The shape of free-jaw extension 40 is exemplary and may include a cross section comprising any shape including, circular, oval, polygon, or any irregular, or abstract shape. Similarly, or alternatively, the shape may be three dimensional such that free-jaw extension 40 provides a sphere, ovoid, polyhedron shae, or the like into groove 42.

As support plate 30 is moved toward fixed jaw 28 by vise 12, free-jaw extension 40 may slide into place in groove 42 of support plate 30. In FIG. 2, groove 42 is shown as a "V" shape. Furthermore, the V shape of groove 42 may act to secure free-jaw extension 40 in position with centerline 58 extending through the center of size pin 44, the center of free-jaw end 48, and the vertex of the V in groove 42. In some embodiments, free-jaw end 48 may slightly lift off of base 16 when free-jaw extension 40 slides into groove 42.

By lifting off the base, free-jaw end 48 can be prevented from any contact with base 16, preventing over constraint of free jaw 26. In some embodiments, free-jaw end 48 may comprise a rounded end, as shown, and free-jaw end 48 may be in contact with base 16 while remaining free to rotate. In some embodiments, free-jaw end 48 may be squared and be lifted, allowing free-jaw end 48 to rotate freely to provide parallelism between fixed-jaw pad 62 and free-jaw pad 60. Any shape may be provided by free-jaw end 48 to allow free jaw 26 to be free to rotate about free-jaw extension 40 and/or size pin 44 to provide free-jaw pad 60 and fixed-jaw pad 62 for securing part 34 when parallel.

Figure 3B:
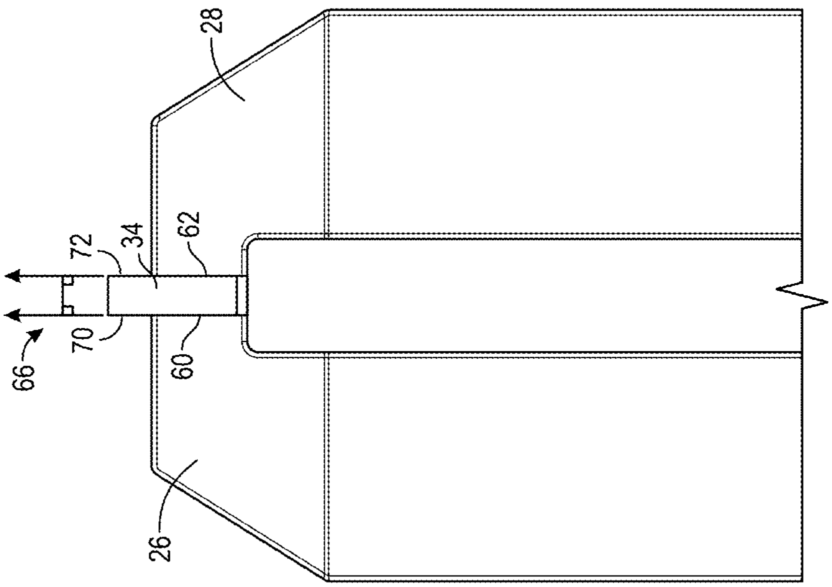
FIGS. 3A-3B depicts exemplary clamped parts illustrating parallelism.
Figure 3A:
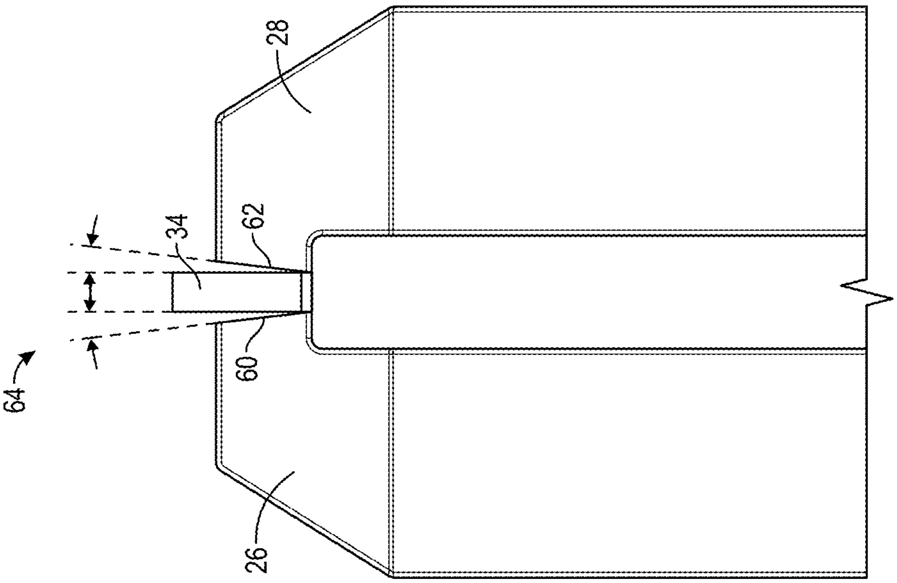

FIG. 3A depicts an exemplary scenario where part 34 is secured with low parallelism. As shown, part 34 is secured such that only a small amount of contact is made between the securing surfaces and part 34, as illustrated by low parallelism diagram 64. As this scenario provides a low amount of contact surface area, the force needed to secure part 34 produces a large amount of pressure at the contact area between the securing surfaces and part 34, where the force is provided by actuating the tightening feature. The high pressure at the points of contact increases the likelihood of damage to part 34 and/or the securing surfaces. As such, providing a higher surface area through parallelism reduces the pressure produced by the necessary securing force, since that force is provided over a larger surface area (as shown in FIG. 3B). Here, in FIG. 3A, the low parallelism is shown as the securing surfaces contact part 34 at a lower point and are not contacting part 34 at an upper point.

FIG. 3B depicts part 34 securing between fixed-jaw pad 62 and free-jaw pad 60 with a high degree of parallelism (i.e., free-jaw pad 60 and fixed-jaw pad 62 are substantially parallel within tolerance) as illustrated by high parallelism diagram 66. With fixed-jaw pad 62 and free-jaw pad 60 parallel, more of the surface area of fixed-jaw pad 62 and free-jaw pad 60 can be in contact with the surface of part 34. The relatively high surface area in contact between free-jaw pad 60 and fixed-jaw pad 62 and part 34 produces a lower pressure for a given force applied. Therefore, the clamping force necessary to secure part 34 may be reduced, and the force required to secure part 34 is spread across a larger surface, decreasing the likelihood of damage to part 34.

It should also be noted that parallelism of free-jaw pad 60 and fixed-jaw pad 62 described herein is an exemplary embodiment. In some embodiments, free jaw 26 may be rotated by tightening feature 32 to provide any desired angle between free-jaw pad 60 and fixed-jaw pad 62. For example, first side 70 and second side 72 of part 34 may not be parallel. In this scenario, it may not be beneficial to provide free-jaw pad 60 and fixed-jaw pad 62 as parallel surfaces. Free-jaw pad 60 and fixed-jaw pad 62 may align with the first side 70 and second side 72 of part 34 when secured to part 34. In some embodiments, free-jaw pad 60 and fixed-jaw pad 62 may be manufactured to not be parallel when free jaw face 67 and fixed jaw face 68 are parallel. For example, free-jaw pad 60 may align with first side 70 and fixed-jaw pad 62 may align with second side 72 when free jaw face 67 and fixed jaw face 68 are parallel. Here, first side 70 and second side 72 of part 34 may be any angle such as −1, −0.5, −0.1, 0.1, 0.5, 1, 2, 5 degrees or any other angle. The parallel case described herein is when an angle of 0 degrees exists between first side 70 and second side 72. Furthermore, in some embodiments, the size of size pin 44 may be adjusted such that free-jaw pad 60 aligns with first side 70 and fixed-jaw pad 62 aligns with second side 72 when part 34 is secured in clamp assembly 14.

Figure 4A:
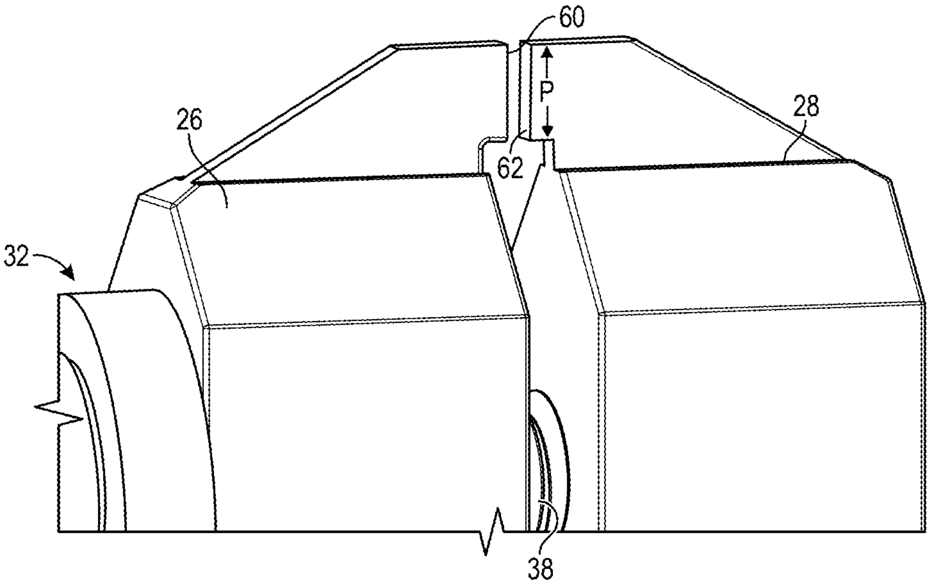
FIGS. 4A-4B depict close-up views of clamp pads of the clamp assembly.
Figure 4B:
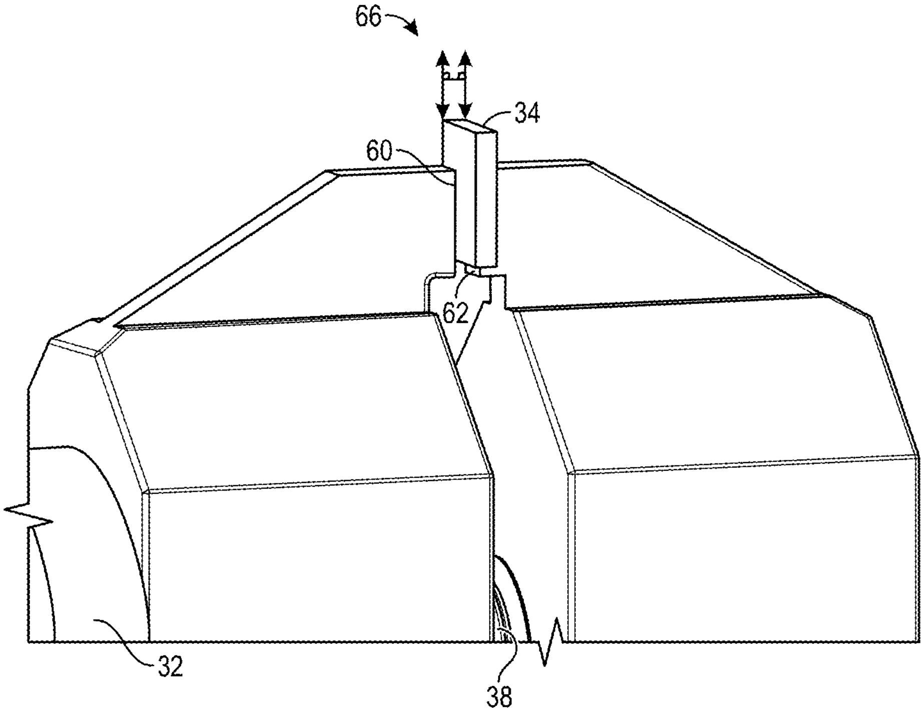

FIGS. 4A-4B depict close-up views of fixed-jaw pad 62 and free-jaw pad 60. In some embodiments, the contact surfaces of free-jaw pad 60 and fixed-jaw pad 62 may be smooth to provide the greatest amount of surface area possible in contact with part 34. As described above, the greater the surface area, the lower the risk of damage to part 34. However, in some embodiments, depending on the material of part 34, it may be necessary to provide texture to free-jaw pad 60 and fixed-jaw pad 62 to increase the holding power. The texture and holding force may depend on the material in contact with part 34. In some embodiments, free-jaw pad 60 and fixed-jaw pad 62 may have different coatings and materials than free jaw 26 and fixed jaw 28. For example, a material may be provided by free-jaw pad 60 and fixed-jaw pad 62 to increase a friction coefficient between free-jaw pad 60 and fixed-jaw pad 62 and, in some embodiments, increase surface area contact. For example, rubber and/or plastic may be added to free-jaw pad 60 and fixed-jaw pad 62. In some embodiments, free-jaw pad 60 and fixed-jaw pad 62 may comprise the material of free-jaw pad 60 and fixed-jaw pad 62, which may be any metal, alloy, or composite.

FIG. 4B further depicts fixed-jaw pad 62 and free-jaw pad 60, securing part 34 between free-jaw pad 60 and fixed-jaw pad 62, which provide smooth and parallel contact surfaces. However, the surfaces of free-jaw pad 60 and fixed-jaw pad 62 may not be flat. In some embodiments, the free-jaw pad 60 and fixed-jaw pad 62 may be configured to the shape of part 34. Here, part 34 comprises flat surfaces, so free-jaw pad 60 and fixed-jaw pad 62 provide flat surfaces. However, free-jaw pad 60 and fixed-jaw pad 62 may provide any irregular surface to match any unique shape of part 34 to provide high surface area contact between free-jaw pad 60, fixed jaw-pad 62, and part 34.

Figure 5A:
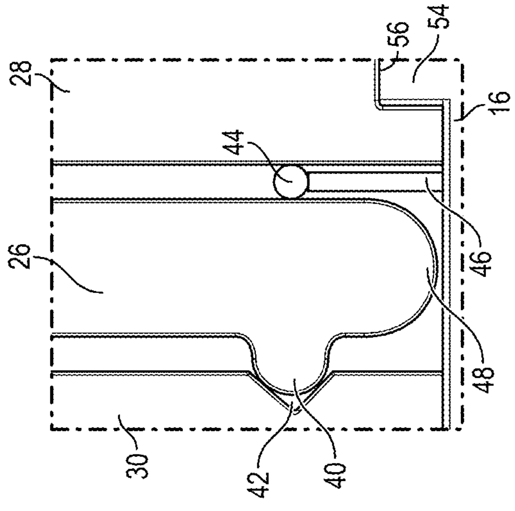
FIGS. 5A-5D depict embodiments of a pivoting system of the clamp assembly.

FIGS. 5A-5D depict alternative embodiments of clamp assembly 14. FIG. 5A depicts groove 42 as V-shaped, as described above. Here, size pin 44 center may be aligned with the center of free-jaw extension 40 and may also be aligned with the vertex of the V of groove 42. However, this configuration is exemplary, and in some embodiments, the vertex and the center of free-jaw extension 40 may be above or below the center of size pin 44. For example, providing the vertex and center of free-jaw extension 40 slightly above the center of size pin 44 may aid in rotating free jaw 26 clockwise when tightening feature 32, as shown in FIG. 4A securing part 34 between free-jaw pad 60 and fixed-jaw pad 62.

Figure 5B:
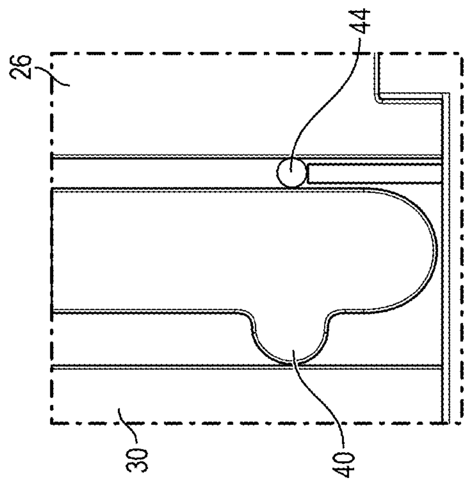

FIG. 5B depicts support plate 30 configured without groove 42. Including groove 42 may provide a vertical constraint to free jaw 26 when free-jaw extension 40 is inserted into groove 42. As described above, free-jaw extension 40 may slide into groove 42 when support plate 30 is moved toward free jaw 26 by vise 12. As support plate 30 moves, free-jaw extension 40 may be received into groove 42, thereby securing free-jaw extension 40 in groove 42. This provides a vertical constraint on free jaw 26 while still allowing free jaw 26 to rotate when tightening feature 32 is rotated. Alternatively, as when there is not a groove 42 provided on support plate 30 in the configuration illustrated in FIG. 5B, there is no vertical constraint. In some embodiments, free jaw 26 may rest on base 16 and rotate on free-jaw end 48.

Figure 5C:
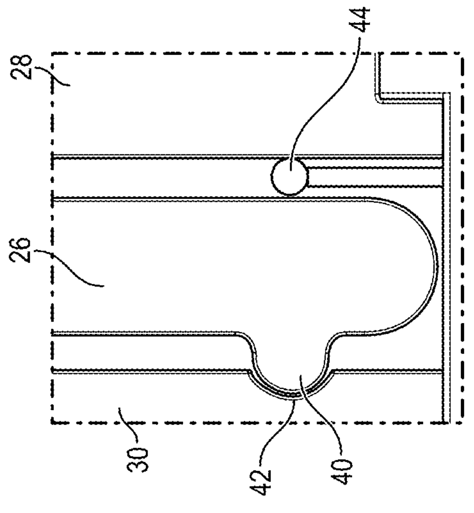
Figure 5D:
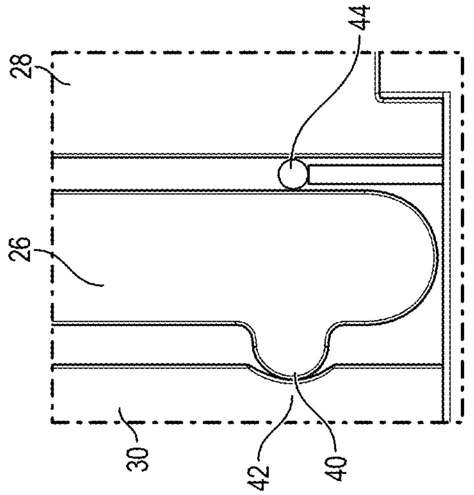

FIG. 5C depicts groove 42 configured as an arc with the same or similar diameter to the diameter of free-jaw extension 40. As free-jaw extension 40 contacts groove 42 free jaw 26 may rise off of base 16 and settle in groove 42. In some embodiments, groove 42 may perfectly, or near perfectly, align such that the center of the arc, the center of free-jaw extension 40, and the center of size pin 44 are aligned with centerline 58. FIG. 5D depicts groove 42 configured as the arc with a different diameter that is larger than the diameter of the rounded end of free-jaw extension 40. Any shape of groove 42 may be imaged for receiving the rounded end of free-jaw extension 40.

FIG. 6 depicts an exemplary process of securing small parts in small-part clamp assembly 10 represented by reference numeral 600. At step 602, size pin 44 may be selected and added between free jaw 26 and fixed jaw 28 on an end opposite, or distal, part 34. As described above, the end of clamp assembly 14 that holds part 34 is referred to as the proximal end 36, and the opposite end of clamp assembly 14, where size pin 44 is located, is referred to as the distal end 37. The proximal end 36 and the distal end 37 may generally be separated by distance D2 or may generally be separated by the distance between tightening feature 32 and size pin 44 such that tightening feature 32 is proximate to free-jaw pad 60, as shown in FIG. 2.

In some embodiments, size pin 44 may be positioned between free jaw 26 and fixed jaw 28 and at the top of stand 46. In some embodiments, a diameter of size pin 44 may be selected based on the width of part 34. For example, when the holding surfaces of free-jaw pad 60 and fixed-jaw pad 62 are parallel, the distance between fixed jaw 28 and free jaw 26 may be equal to the width, or diameter, of size pin 44, including tolerances in the size pin 44, part 34, fixed jaw 28, and free jaw 26. As such, size pin 44 diameter may be selected at least partially based on A+B+C described above and shown in FIG. 2. If A and C are equal to zero, then the diameter of the size pin 44 will be equal to the B width of the part.

Furthermore, in some embodiments, the height of stand 46 may be selected based on a diameter of size pin 44. Once the diameter of size pin 44 is known, a height of stand 46 may be selected further based on the locations of free-jaw extension 40 and groove 42. As described above, the height of stand 46 may be selected to provide the center of size pin 44 substantially aligned with the center of free-jaw extension 40 and/or the center, or vertex, of groove 42. Therefore, when assembled, centerline 58 may extend through the center, or the vertex, of groove 42, the center of free-jaw extension 40, and the center of size pin 44. The centerline 58 configuration described here is exemplary, and it should be noted that size pin 44 may be provided above or below centerline 58.

Furthermore, in some embodiments stand 46 may represent any method of aligning the center of size pin 44 with centerline 58. For example, stand 46 may represent an adhesive on the interior sides of free jaw 26 and fixed jaw 28 (i.e., free jaw face 67 and fixed jaw face 68). In some embodiments, stand 46 may represent a magnetic material provided on free jaw face 67 and fixed jaw face 68 configured to magnetically hold size pin 44 aligned with centerline 58 as described above.

At step 604, clamp assembly 14 may be secured in vise 12. As described above, vise screw 38 may be rotated to move free vise jaw 22 toward fixed vise jaw 18. Furthermore, free vise jaw 22 may be fixed to support plate 30, which, in turn, is in contact with free jaw 26. Therefore, as free vise jaw 22 is moved toward fixed vise jaw 18, free jaw 26 moves toward fixed jaw 28. In some embodiments, free vise jaw 22 may be moved until size pin 44 is secured between free jaw 26 and fixed jaw 28. At this point, tightening feature 32 may be positioned such that the space between free-jaw pad 60 and fixed-jaw pad 62 is slightly larger than the width of part 34. Furthermore, an angle between the holding surfaces of free-jaw pad 60 and fixed-jaw pad 62 may be slightly greater than parallel, as shown in FIG. 3A.

At step 606, part 34 may be placed between free-jaw pad 60 and fixed-jaw pad 62. The holding surfaces of free-jaw pad 60 and fixed-jaw pad 62 may be positioned slightly wider than the width of part 34, allowing part 34 to be inserted between the securing surfaces of free-jaw pad 60 and fixed-jaw pad 62. Furthermore, at this point, the holding surfaces are not parallel but are slightly wider than parallel, allowing rotation of free jaw 26 about size pin 44 to move the securing surface of free-jaw pad 60 to parallel with fixed-jaw pad 62 as described in step 608.

At step 608, tightening feature 32 may be rotated, securing part 34 between free-jaw pad 60 and fixed-jaw pad 62 with a high degree of parallelism. As tightening feature 32 is actuated, free jaw 26 may rotate about size pin 44 until the securing surface of free-jaw pad 60 is parallel with the securing surface of fixed-jaw pad 62 and, simultaneously, free pad surface and fixed pad surface secure part 34 therebetween. Therefore, part 34 is secured between free-jaw pad 60 and fixed-jaw pad 62 with a high degree of parallelism between the free pad surface and fixed pad surface such that a relatively small tightening action is required to secure part 34.

In some aspects, the techniques described herein relate to a clamp assembly for securing a part, including: a free jaw including a free jaw pad at a free jaw proximal end; a fixed jaw including a fixed jaw pad at a fixed jaw proximal end; a size pin disposed between the free jaw and the fixed jaw and contacting the free jaw at a free jaw distal end and contacting the fixed jaw at a fixed jaw distal end; and a tightening feature spanning a space between the free jaw and the fixed jaw, wherein the tightening feature is configured to rotate the free jaw about the size pin and move the free jaw pad relative to the fixed jaw pad until the free jaw pad and the fixed jaw pad are substantially parallel and secure the part therebetween.

In some aspects, the techniques described herein relate to a clamp assembly, wherein a diameter of the size pin is selected based on a width of the part.

In some aspects, the techniques described herein relate to a clamp assembly, wherein the tightening feature is disposed between the part and the size pin proximate the free jaw pad and proximate the fixed jaw pad.

In some aspects, the techniques described herein relate to a clamp assembly, further including a support plate adjacent the free jaw and configured to press against the free jaw to move the free jaw securing the size pin between the free jaw and the fixed jaw.

In some aspects, the techniques described herein relate to a clamp assembly, wherein the free jaw includes an extension, wherein the extension is configured to contact the support plate providing lateral and vertical support to the free jaw.

In some aspects, the techniques described herein relate to a clamp assembly, wherein the support plate includes a groove configured to receive the extension of the free jaw.

In some aspects, the techniques described herein relate to a clamp assembly, wherein the extension includes a semicircle, and wherein a center of the semicircle is in line with a pin center of the size pin.

In some aspects, wherein a first tolerance of parallelism between the free jaw pad and the fixed jaw pad is within a second tolerance in manufacturing of the part In some aspects, the techniques described herein relate to a clamp assembly for securing a part, including: a free jaw including a free jaw pad at a free jaw proximal end; a fixed jaw including a fixed jaw pad at a fixed jaw proximal end and an extension; a support plate configured to receive the extension and provide lateral support to the free jaw by the extension; a size pin disposed between the free jaw and the fixed jaw and contacting the free jaw at a free jaw distal end and contacting the fixed jaw at a fixed jaw distal end; and a tightening feature spanning a space between the free jaw and the fixed jaw, wherein the tightening feature is configured to rotate the free jaw about the size pin and move the free jaw pad relative to the fixed jaw pad until the free jaw pad and the fixed jaw pad are substantially parallel and secure the part therebetween.

In some aspects, the techniques described herein relate to a clamp assembly, further including a groove of the support plate configured to receive the extension and provide the lateral and vertical support.

In some aspects, the techniques described herein relate to a clamp assembly, further including a stand configured to support the size pin between the free jaw and the fixed jaw.

In some aspects, the techniques described herein relate to a clamp assembly, wherein a height of the stand positions a center of the size pin in line with an extension center of the extension and a groove center of the groove.

In some aspects, the techniques described herein relate to a clamp assembly, wherein the groove is a V shape, and the groove center is a vertex of the V shape.

In some aspects, the techniques described herein relate to a clamp assembly, wherein a diameter of the size pin is selected based on a width of the part.

In some aspects, the techniques described herein relate to a clamp assembly, wherein the tightening feature is disposed between the part and the size pin proximate the free jaw pad and proximate the fixed jaw pad.

In some aspects, the techniques described herein relate to a method of clamping a part by a clamp assembly, the method including: actuating a vise actuator to move a free vise jaw, wherein the free vise jaw is adjacent a support plate and moves the support plate, wherein the support plate is adjacent a free jaw and moves the free jaw as the vise actuator is actuated; securing a size pin between the free jaw and a fixed jaw as the vise actuator is actuated; positioning the part between a free jaw pad of the free jaw and a fixed jaw pad of the fixed jaw; actuating a tightening feature to rotate the free jaw pad about the size pin and toward the fixed jaw pad; and securing the part between the fixed jaw pad and the free jaw pad when the free jaw pad and the fixed jaw pad are substantially parallel.

In some aspects, the techniques described herein relate to a method, wherein a diameter of the size pin is selected based on a width of the part.

In some aspects, the techniques described herein relate to a clamp assembly, wherein the tightening feature is disposed between the part and the size pin proximate the free jaw pad and proximate the fixed jaw pad.

In some aspects, the techniques described herein relate to a method, further including: receiving an extension of the free jaw into a groove of the support plate; and when the tightening feature is actuated, the extension rotates within the groove until the part is secured between the free jaw pad and the fixed jaw pad.

In some aspects, the techniques described herein relate to a method, wherein the groove is a V shape, wherein the extension includes a rounded end; and the method further includes providing the rounded end of the extension in the V shape of the groove.

Although the invention has been described with reference to the embodiments illustrated in the attached drawing figures, it is noted that equivalents may be employed, and substitutions made herein without departing from the scope of the invention.

Having thus described various embodiments of the disclosure, what is claimed as new and desired to be protected by Letters Patent includes the following:

The invention claimed is:

1. A clamp assembly for securing a part, comprising:
   - a free jaw comprising a free jaw pad at a free jaw proximal end and an extension fixed to the free jaw and immovable relative to the free jaw;
   - a fixed jaw comprising a fixed jaw pad at a fixed jaw proximal end;
   - a size pin disposed between the free jaw and the fixed jaw and contacting the free jaw at a free jaw distal end and contacting the fixed jaw at a fixed jaw distal end; and
   - an actuator spanning a space between the free jaw and the fixed jaw,
   - wherein the actuator is configured to rotate the free jaw and move the free jaw pad relative to the fixed jaw pad until the free jaw pad and the fixed jaw pad are substantially parallel and secure the part therebetween;
   - a support plate adjacent the free jaw and configured to press against the free jaw to move the free jaw securing the size pin between the free jaw and the fixed jaw; and
   - wherein the extension is configured to contact the support plate providing lateral and vertical support to the free jaw.

2. The clamp assembly of claim 1, wherein a diameter of the size pin is selected based on a width of the part.

3. The clamp assembly of claim 1, wherein the actuator is disposed between the part and the size pin proximate the free jaw pad and proximate the fixed jaw pad.

4. The clamp assembly of claim 1, wherein the support plate comprises a groove configured to receive the extension of the free jaw.

5. The clamp assembly of claim 4, wherein the extension comprises a semicircle, and wherein a center of the semicircle is in line with a pin center of the size pin.

6. The clamp assembly of claim 1, wherein a first tolerance of parallelism between the free jaw pad and the fixed jaw pad is within a second tolerance in manufacturing of the part.

7. The clamp assembly of claim 1,
   - wherein the support plate comprises a groove configured to receive the extension of the free jaw, and
   - wherein the groove is V-shaped, and the size pin is based at least in part on a width of the part and a depth of the V in the groove.

8. The clamp assembly of claim 7, wherein the fixed jaw and the free jaw are parallel when the part is fully clamped based on the width of the part, the depth of the V, and the size of the size pin.

9. A clamp assembly for securing a part, comprising:
   - a free jaw comprising a free jaw pad at a free jaw proximal end and an extension;
   - a fixed jaw comprising a fixed jaw pad at a fixed jaw proximal end;
   - a support plate configured to receive the extension and provide lateral support to the free jaw by the extension, wherein the support plate is provided on a first side of the free jaw, and the fixed jaw is provided on a second side of the free jaw opposite the first side, wherein the extension extends from the first side of the free jaw;

a size pin disposed between the free jaw and the fixed jaw and contacting the free jaw at a free jaw distal end and contacting the fixed jaw at a fixed jaw distal end; and a actuator spanning a space between the free jaw and the fixed jaw, wherein the actuator is configured to rotate the free jaw about the size pin and move the free jaw pad relative to the fixed jaw pad until the free jaw pad and the fixed jaw pad are substantially parallel and secure the part therebetween.

10. The clamp assembly of claim 9, further comprising a groove of the support plate configured to receive the extension and provide the lateral support.

11. The clamp assembly of claim 10, further comprising a stand configured to support the size pin between the free jaw and the fixed jaw.

12. The clamp assembly of claim 11, wherein a height of the stand positions a center of the size pin in line with an extension center of the extension and a groove center of the groove.

13. The clamp assembly of claim 12, wherein the groove is a V shape, and the groove center is a vertex of the V shape.

14. The clamp assembly of claim 9, wherein a diameter of the size pin is selected based on a width of the part.

15. The clamp assembly of claim 9, wherein the actuator is disposed between the part and the size pin proximate the free jaw pad and proximate the fixed jaw pad.

* * * * *